Figure 1:
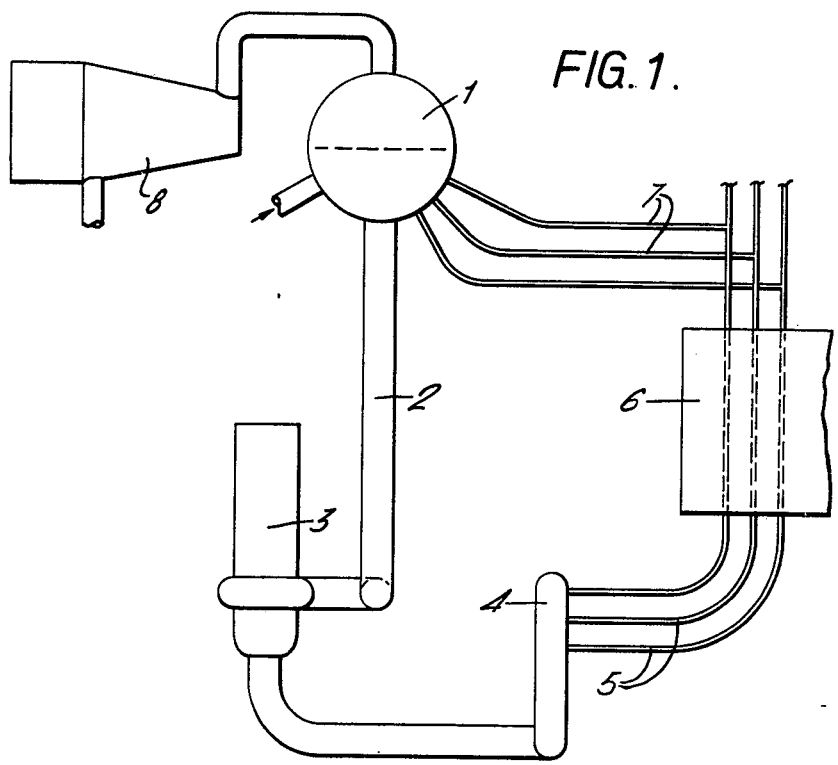

United States Patent

Middleton

[11] 3,981,770
[45] Sept. 21, 1976

[54] PROTECTIVE ARRANGEMENTS FOR COOLING SYSTEMS

[75] Inventor: John Ernest Middleton, Great Glen, England

[73] Assignee: Nuclear Power Company (Whetstone) Limited, England

[22] Filed: Apr. 24, 1974

[21] Appl. No.: 463,778

[30] Foreign Application Priority Data
Apr. 25, 1973 United Kingdom.............. 19599/73

[52] U.S. Cl.................................. 176/37; 176/38; 176/65; 137/604
[51] Int. Cl.²......................................... G21C 19/40
[58] Field of Search............ 176/37, 38, 65; 55/198; 62/22; 137/604

[56] References Cited
UNITED STATES PATENTS

| | | | |
|---|---|---|---|
| 1,786,357 | 12/1930 | Miller | 137/604 X |
| 2,926,127 | 2/1960 | McCorkle | 176/37 |
| 3,342,378 | 9/1967 | Mezoff et al. | 137/604 X |
| 3,350,277 | 10/1967 | Costes | 137/604 X |
| 3,677,293 | 7/1972 | Furlong et al. | 176/37 X |
| 3,702,281 | 11/1972 | Birts et al. | 176/37 |
| 3,718,539 | 2/1973 | West et al. | 176/37 |
| 3,726,297 | 4/1973 | Heimann et al. | 137/604 X |

*Primary Examiner*—Samuel W. Engle
*Assistant Examiner*—Peter A. Nelson
*Attorney, Agent, or Firm*—Kirschstein, Kirschstein, Ottinger & Frank

[57] ABSTRACT

A protective arrangement for a cooling system of the kind in which a fluid, which may be in the form of a liquid, gas, vapor or a two-phase fluid, is arranged to be circulated around the system under pressure, said protective arrangement comprising means for injecting into the system fluid under pressure for maintaining a flow in the normal direction through a region of the system, or for preventing cessation or reversal of flow through said region, for a period following a reduction in the pressure of the normal circulating fluid feeding said region, which may be due for example to a breach in a part of the system upstream from said region.

19 Claims, 15 Drawing Figures

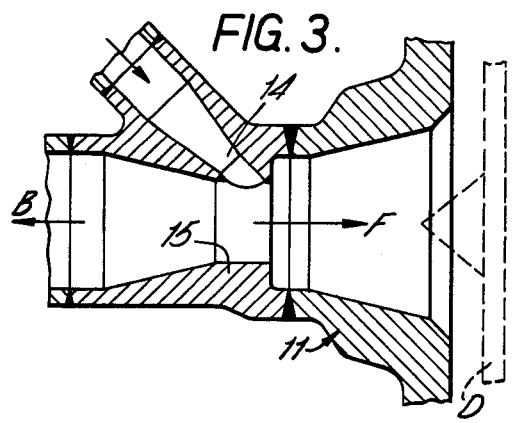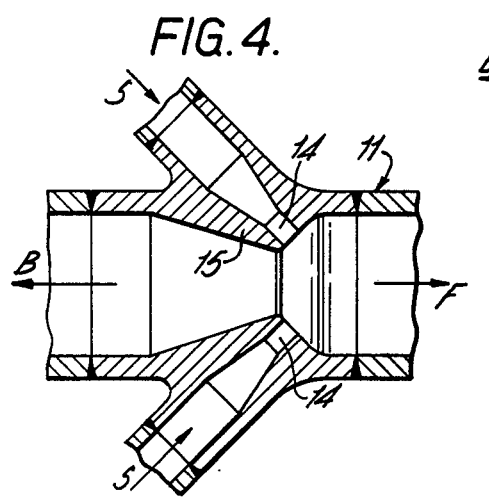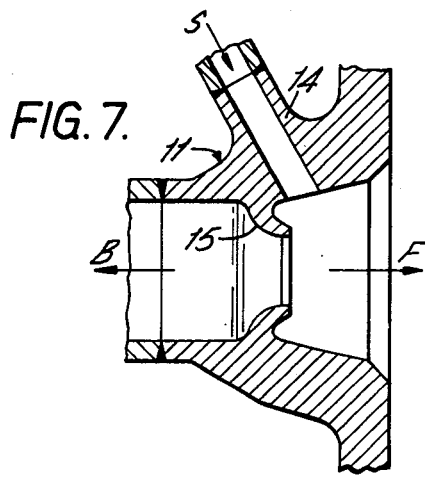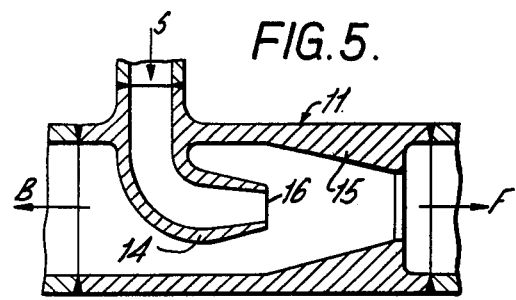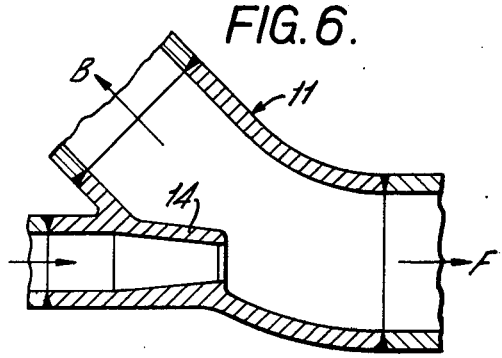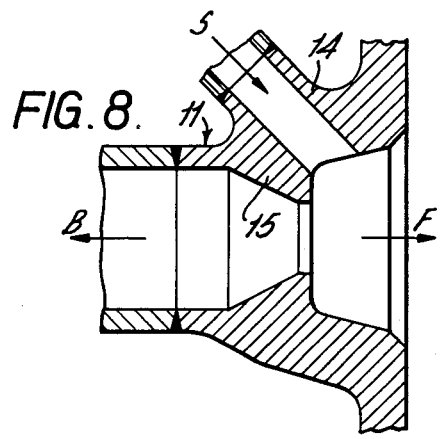

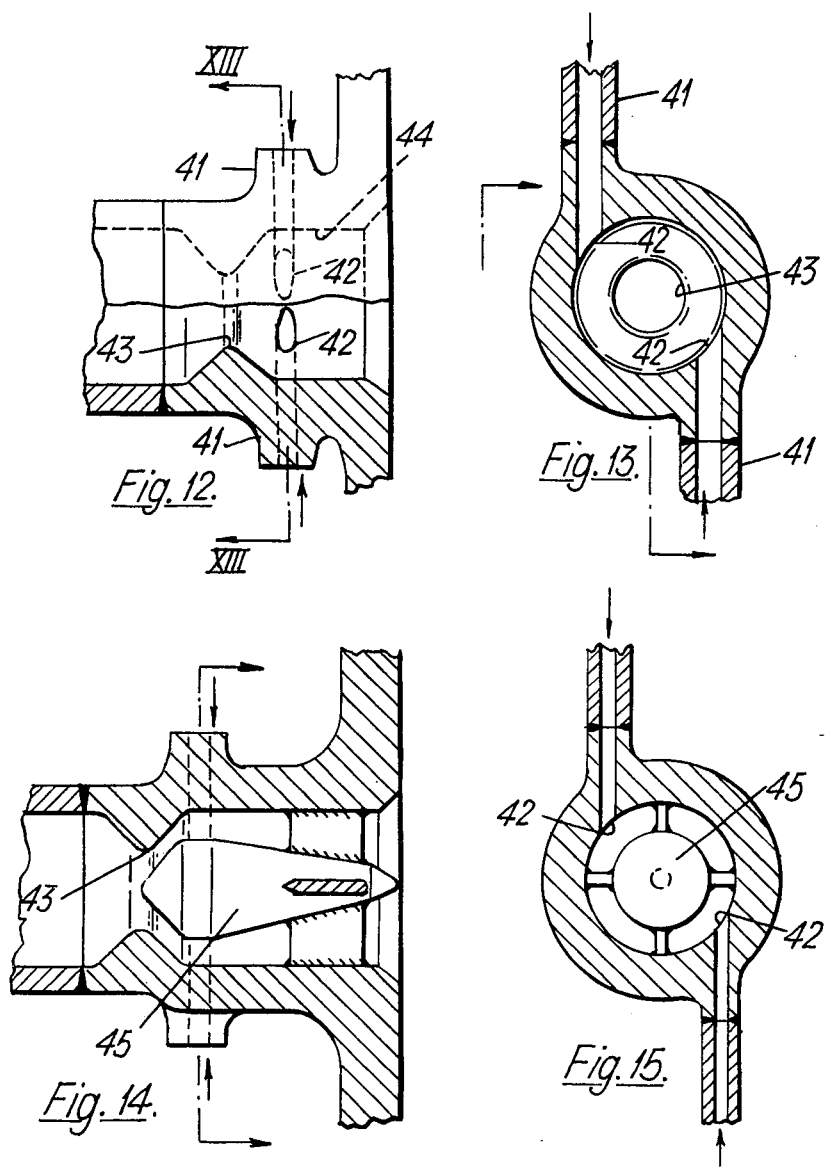

PROTECTIVE ARRANGEMENTS FOR COOLING SYSTEMS

This invention relates to cooling systems of the kind in which a fluid, which may be in the form of a liquid, gas, vapour or a two-phase fluid is arranged to be circulated around the system under pressure, and relates more particularly to protective arrangements for such systems.

The invention is especially applicable to fluid-cooled nuclear reactors. In such devices a breach in the cooling system, leading to a loss of normal circulation, could result in overheating of the reactor core with serious consequences. Although it is possible to provide for a rapid shut down of the reactor, and the removal of heat from the core by an emergency cooling system, in the event of such a fault, these operations may take several seconds to become fully effective, and by that time the temperature of the core may have risen to a point where severe damage has occurred, due to redistribution of the total stored heat of the core and heat generated by delayed neutrons.

Similarly in other applications utilising a fluid cooling system a breach in the system may also result in the overheating of associated equipment, and possibly cause damage to it, before remedial action can become fully effective.

According, therefore, to the invention a protective arrangement for a cooling system of the kind referred to, comprises means for injecting into the system fluid under pressure for maintaining a flow in the normal direction through a region of the system, or for preventing cessation or reversal of flow through said region, for a period following a reduction in the pressure of the normal circulating fluid feeding said region, which may be due for example to a breach in a part of the system upstream from said region.

By this means it is possible to maintain a flow of fluid through a required region of the system, and thus prevent overheating at that region, for a period sufficient for other protective arrangements, for example of known kind, to become effective.

The point of injection of the high pressure fluid will, for any particular arrangement in accordance with the invention, depend upon the particular part of the cooling system required to be protected; for example in the case of a cooling system for a fluid-cooled nuclear reactor the protective arrangement may be arranged to inject fluid under pressure into the system just upstream of the reactor core.

The fluid injected into the system may be in the form of a liquid, gas, vapour or two-phase fluid (e.g., liquid/vapour) and may be the same as or different from the normal circulating fluid.

The protective arrangement conveniently comprises an auxiliary store of high energy fluid, for example in the form of a vessel containing said fluid at a suitably high temperature and pressure, connected into the system at an appropriate point through suitable nozzle means.

The fluid within the vessel may in some cases be maintained at a saturation temperature equivalent to the normal operating pressure of the part of the system to which the nozzle means is connected, so that in the event of a breach, leading to a reduction in pressure in that part of the system, high pressure fluid will be injected into the system automatically.

Alternatively the fluid in the vessel may be maintained at a pressure higher than the normal circulating fluid pressure, a normally closed mechanical valve being located between the vessel and the nozzle means, and valve actuating means being arranged to open the valve automatically in response to a drop in pressure in the system.

By arranging for the pressure fluid to be injected into the system at a suitably high velocity it is possible to form a high pressure region of sufficient magnitude to achieve a desired distribution of fluid flows in the system on the occurrence of fault conditions leading to a reduction in pressure of the normal circulating fluid.

Preferably the nozzle means is disposed so as to direct the pressure fluid into the system with a component of velocity in the direction of the normal fluid flow.

Preferably the normal coolant path is formed with a construction in the vicinity of the nozzle means to aid production of a high pressure region, and/or to ensure substantial reduction in backflow through the constriction. The constriction can, with advantage, be designed to have a lower resistance to flow in the normal direction than its resistance to back flow. Such a constriction is commonly known as a fluid diode.

Figure 2:
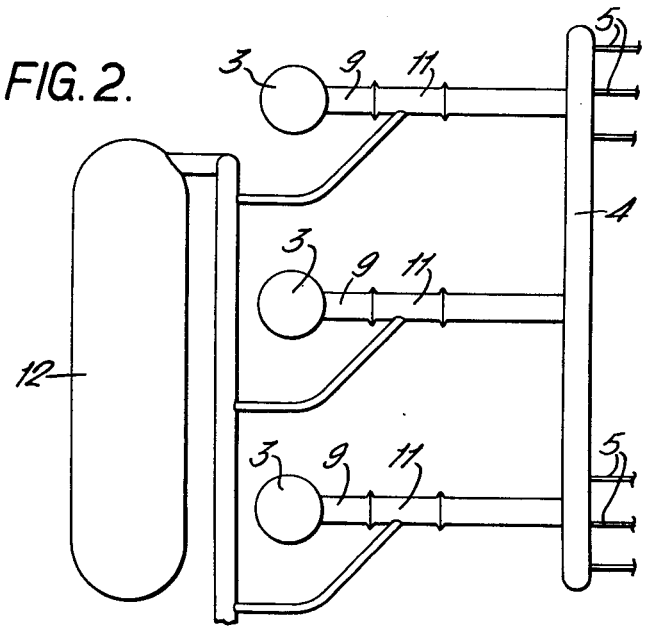
Figure 9:
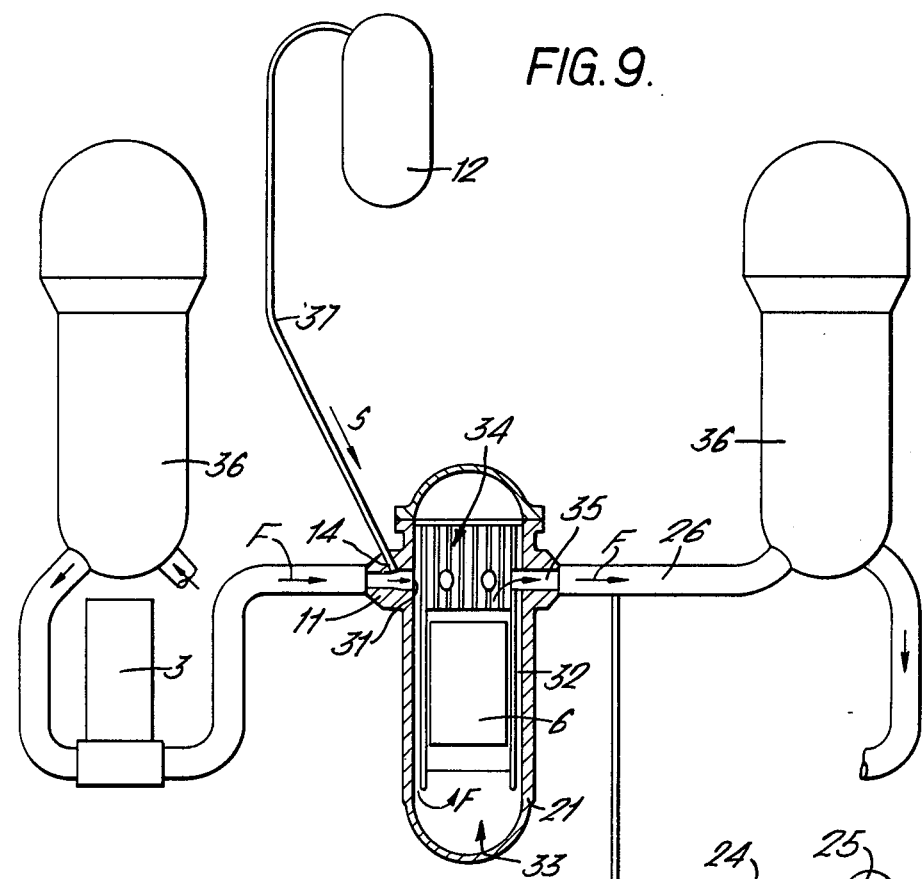
Figure 11:
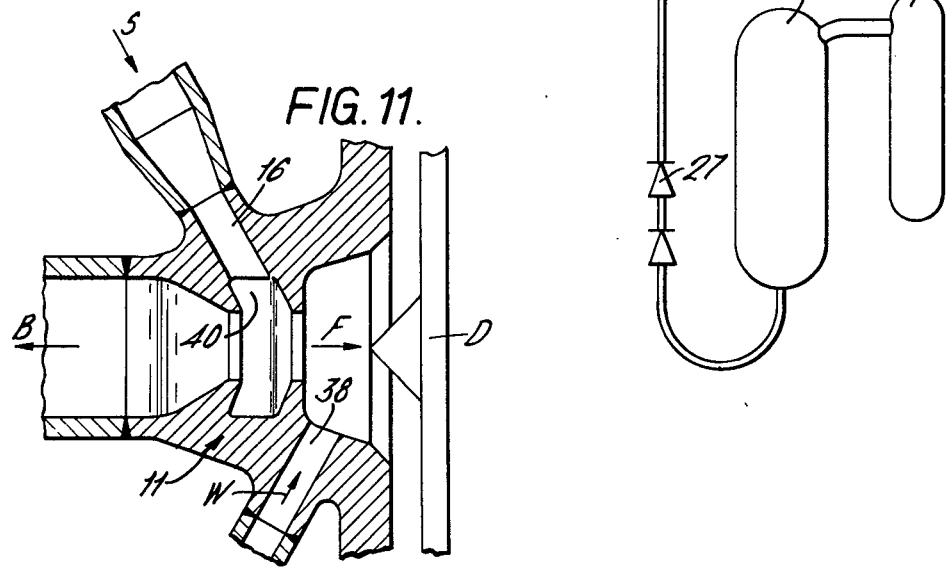
Figure 10:
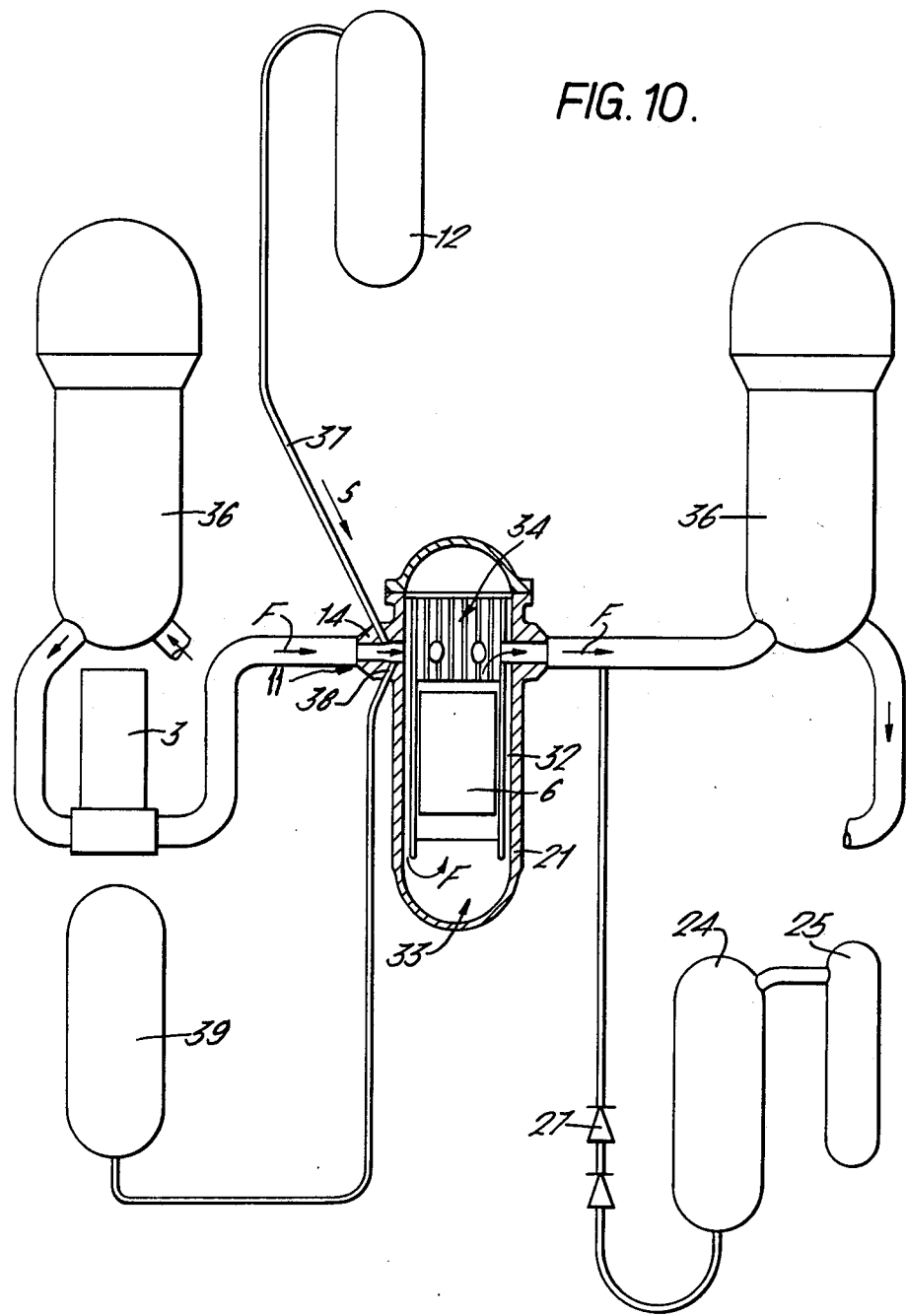

Several different embodiments of the invention will now be described by way of example with reference to FIGS. 1 to 15 of the accompanying schematic drawings, in which:

FIG. 1 illustrates diagrammatically a typical cooling system for a steam generating heavy water reactor, FIG. 2 shows a protective arrangement in accordance with the invention applied to part of the system, FIGS. 3 to 8 illustrate various forms of pressure fluid injectors suitable for use in the protective arrangement of FIG. 2, FIGS. 9 and 10 illustrate different applications of the invention to a pressure vessel nuclear reactor, FIG. 11 illustrates the form of pressure fluid injector employed in the protective arrangement of the system shown in FIG. 10, FIG. 12 illustrates another form of pressure fluid injector, FIG. 13 is a section taken on the line XIII—XIII in FIG. 12, looking in the direction of the arrows, FIG. 14 is a further form of pressure fluid injector provided with a diffuser, and FIG. 15 is a section taken on the line XV—XV in FIG. 14, looking in the direction of the arrows.

Referring first to FIG. 1, in this typical cooling system for a steam generating heavy water reactor, pressurised water at close to saturation temperature passes from a steam drum 1 through downpipes 2 (only one of which is shown), and is pumped by circulator pumps 3 into a feeder header 4 and thence through separate feeder pipes 5 to each channel in the reactor core 6. In passing through the fuel in the core the water is raised to saturation temperature and boiling occurs to provide a net generation of steam. The two phase steam/water mixture then passes through riser pipes 7 to the steam drum where steam is separated and used to drive a turbo-generator shown schematically at 8. Condensate from the turbine is fed back into the steam drum 1 where it mixes with the water content to give sub-cooling of the downflow. The water flow in the pump outlet pipes 9, the feeder header 4 and the feeder pipes is further sub-cooled due to the pressure increase across the circulator pump 3.

In the case of a sudden severe failure of the steam drum 1, much of the fluid contents of the associated coolant circuit could discharge in a few seconds, and consequently the normal forced convection cooling of the core 6 would be rapidly lost due to circuit depressurisation. Thus water contained in the feeder header 4 would then normally discharge by two routes, namely by considerably reduced flow in the normal direction through the core 6 and riser pipes 7, and by a backflow through the circulator pumps 3 and the downpipes 2; due to the reduced flow through the core the temperature of the latter will rise, and may result in damage to the fuel cladding in a very short while.

Although it is possible to provide for a rapid shut down of the reactor from sensing the immediate consequence of the breach by suitable monitoring means, and for heat generated in the fuel removed by some form of emergency spray cooling system, such a system may take several seconds to become fully effective by which time severe damage may have occurred.

This is substantially avoided by the use of a protective arrangement in accordance with the invention. Thus referring to FIG. 2, which illustrates, in plan, a part of the system shown in FIG. 1 incorporating such a protective arrangement, the pump outlet pipes 9 are each provided with an injector device 11 capable of being supplied with high pressure steam from a storage vessel 12. This contains water and steam maintained by electrical or other form of heating and any suitable control means (not shown), at the saturation temperature equivalent to the operating pressure in the pump outlet pipes 9. Alternatively the storage vessel 12 may consist of a second reactor coolant system arranged to act as a fluid reservoir but otherwise segregated from the first.

Consequently during normal operation there is no appreciable discharge of steam from the storage vessel 12 into the system. However in the event of a steam drum failure, which would otherwise result in the normal forced convection cooling of the core being rapidly lost due to circuit depressurisation as above described, there will be a reduction of pressure in the pump outlet pipes 9 and consequently steam will be injected into these pipes 9 from the storage vessel 12. Thus due to the addition of feed water into the steam drum 1 and the rise in pressure through the circulator pumps 3, water in the feed header 4 will be sub-cooled by some 20 Btu/lb in a typical system, and immediately on failure of the drum the hydraulic pressure in the header will therefore fall by about 100 p.s.i. Consequently this will result in a minimum of 100 p.s.i. potential between the storage vessel 12 and the feed header. The effect of this will be to prevent, or at least substantially reduce, the backflow of fluid from the header 4 and to cause all or a substantial proportion of the fluid content of the header to discharge by forward flow through the core 6. In addition, as the circuit pressure rapidly decreases, the potential for driving fluid from the storage vessel 12 into the header will effectively increase, causing rapid discharge of the vessel contents into the feeder header 4, this flow augmenting the fluid content of the header and assisting in maintaining a degree of forced convection cooling of the core, the capacity of the storage vessel being such as to prevent any excessive rise in the core temperature for a time sufficient for conventional safety operations to take place.

In a modification of the arrangement described above the fluid within the storage vessel 12 is maintained at a higher pressure and temperature than the feeder header 4, and normally closed mechanical valves are provided in the pipelines connecting the vessel with the pump outlet pipes 9, and arranged to be opened in response to a breached circuit trip device.

The protective arrangement may also operate in some cases to maintain a flow of cooling fluid through the core for a short period in the event of a breach in the feeder header 4. Thus with a certain range of breach size it can be shown that for conventional cooling systems the forced circulation may be affected to an extent which produces a state of stable flow stagnation in the core, the size of the breach potentially resulting in stagnation being a function of the normal flow rate. In the event of such a breach occurring in a system employing a protective arrangement as described above the pumped fluid flow will be augmented by the injection into the system of steam at a high velocity causing the discharge from the breach to be replaced in the header so that the flow to the core 6 will be maintained for the short period necessary to remove stored and delayed neutron heat.

A number of different injector devices suitable for use in the system above described will now be described with reference to FIG. 3 to 8.

In the device illustrated in FIG. 3 the direction of the normal coolant flow is from left to right as indicated by the arrow F. A nozzle 14, the outer end of which is connected to the storage vessel 12 extends through the side of the device at an angle, as shown, so that when the protective arrangement is operative steam at high pressure is injected into the system with a component of velocity in the direction of the normal coolant flow. By this means backflow through the system, in the direction indicated by the arrow B, is temporarily prevented or at least significantly reduced. The effect is enhanced by locating the nozzle 14 in the vicinity of a venturi constriction 15 having a lower resistance to flow in the normal direction F than to backflow.

Two injector nozzles 14 may be provided, and in an alternative construction utilising two nozzles as illustrated in FIG. 4 these are disposed just downstream of a venturi constriction 15.

FIG. 5 shows another form of injector device in which a single nozzle 14 has its outlet 16 disposed concentrically within the bore of the device just upstream of a venturi constriction 15 so as to direct a jet of high pressure steam from the storage vessel 12 substantially parallel to the normal direction of flow of cooling fluid.

Another device in which the nozzle 14 is arranged to direct a jet of high pressure steam parallel to the normal direction of flow of the cooling fluid is shown in FIG. 6, the device in this case having a main bore with a pronounced curvature so that the main cooling fluid follows a curved path as shown, the nozzle extending through the wall of the device on the outside of the curve so that its outlet is coaxial with the main outlet of the device.

FIGS. 7 and 8 illustrate two further devices in which the injector nozzles are inclined to the main fluid flow and are disposed downstream of venturi constriction 15.

FIGS. 12 and 13 show yet another form of injector device known as a vortex amplifier. The fluid from the storage vessel 12 is injected through two pipes 41 having outlet openings 42 just downstream of a venturi restriction 43. The fluid is injected tangentially to the circumference of the bore 44 of the device so that a vortex is produced which substantially reduces backflow by choking at the venturi restriction 43.

The efficiency of the vortex in choking the backflow may be improved by the provision of a diffuser 45 as shown in FIGS. 14 and 15. The diffuser 45 is located adjacent to or just downstream of the outlet openings 42 so that choking is enhanced at the venturi constriction 43.

The injector devices shown in FIGS. 3, 4, 7, 8 and 11 may also be modified so that the nozzles 14 are disposed tangentially to the circumference of the bore of the device and thus create a vortex which reduces backflow by choking at the venturi constriction.

The application of the invention to the primary coolant circuit of a pressurised water reactor is illustrated in FIG. 9. In this arrangement the reactor core 6 enclosed within a pressure vessel 21. In operation sub-cooled high pressure water is pumped by circulator pumps 3 around a number of similar closed external loop circuits which connect in parallel with the pressure vessel 21, and due to the internal structure of the vessel the water is forced to pass upwards through the core.

Thus water is fed into the vessel 21 through inlets 31 and is then guided down an annular space 32 surrounding the core 6 into an inlet plenum 33 at the bottom of the vessel. From the inlet plenum 33 water passes upwards through the core 6 where heat is transferred from the fuel to raise the water temperature. The higher temperature water then discharges into the vessel top plenum 34 and thence through vessel outlets 35 into the parallel heat transfer loops.

The loops carry the water to heat exchanger/steam generators 36 where sensible heat is removed to produce steam in secondary coolant loops (not shown) which operate at lower pressure, the steam generated being used to drive a turbine. From the heat exchanger/steam generators 36 water in the primary coolant circuit is returned to the pressure vessel 21 by the circulator pumps 3.

Provision for emergency core cooling in the event of a breach in the loop pipework is normally made by discharge of cold water into the loops from high pressure accummulators or by electrically pumped systems using low pressure water sources but such arrangements may take several seconds to become fully effective. Moreover due to the geometry of the primary coolant system, the top and bottom plena 33, 34 tend to depressurise ostensibly at the same rate after the initial few seconds due to the flow in the inlet pipework reversing due to the influence of the breach discharge. Consequently the pressure difference between the plena will normally be insufficient to maintain a coolant flow through the core during the critical period when stored heat and delayed neutron heat must be removed from the fuel. In addition coolant water fed into the loops may in some cases be discharged from the breach without entering the core.

According therefore to the invention a protective arrangement is provided for injecting steam at high pressure into the loops adjacent the inlets to the pressure vessel. Thus each water inlet 31 to the pressure vessel is provided by an injector 11 similar in form to any of those illustrated in FIGS. 3 to 8, the injector being shown diagrammatically for simplicity. A nozzle 14 in each device is connected to a storage vessel 12 containing water and steam at a suitably high pressure and temperature. Thus the storage vessel could be maintained at a pressure corresponding to the normal coolant circuit pressure so that in normal operation there would be negligible interchange flow through the interconnecting pipelines 37. However in the event of a breach in the coolant circuit, which would lead to an almost immediate circuit pressure reduction, steam or two-phase fluid depending upon the quantities of water and steam stored would be injected into the pressure vessel 21 through the injectors 11 at high velocity, thereby maintaining a pressure in the inlet plenum 33 sufficient to maintain a flow of water in the normal direction through the core 6. Preferably a diffuser, represented by the broken line D in FIG. 3, is located across the mouth of each said device within the pressure vessel 21 to minimise the constriction of flow in the normal direction.

In addition cold water in an accumulator 24 and maintained under pressure by a gas cylinder 25 is caused to be discharged into the pressure vessel outlet pipes 26 close to the vessel through non-return valves 27 following a breach in the system to assist depressurisation of the top plenum 34 and provide core reflooding water.

In a modification (not shown) the cold water accumulator instead of discharging into the outlet pipes 26 is arranged to be injected directly into the top plenum 34 through special nozzles in the shut-down rod penetrations to give a coolant deluge directly on to the top of the core.

The pressurised water reactor of FIG. 10 is similar to that shown in FIG. 9 except that the injector device 11 has an additional inlet nozzle 38 connected to a further storage vessel 39 containing hot water under high pressure, so that in the event of a breach in the primary cooling circuit, leading to a loss of pressure, hot water is injected into the inlet plenum 33 in addition to the high pressure steam for maintaining a high pressure in the inlet plenum.

A suitable injector device for such an arrangement is illustrated in FIG. 11, the steam nozzle 14 being arranged to inject steam at high velocity into an annular recess 40 just downstream of a venturi constriction to create a region of high pressure and the nozzle 38 is disposed so as to feed the hot water into the system just downstream of the recess 40. A diffuser D is again mounted across the mouth of the injector device within the pressure vessel.

In the arrangements illustrated in FIGS. 9 and 10 a single storage vessel 12 may be common to all the injector devices associated with the different loop circuits, although if desired separate storage vessels may be individually associated with the different injector devices. In the arrangement of FIG. 10 also either a common or individual hot water storage vessels 39 may be used to feed hot water to the different injector devices.

In addition the storage vessel or vessels 12 may be maintained at higher than normal circuit operating pressure, normally closed mechanical valves in the pipelines interconnecting the vessel or vessels with the nozzles 14 of the injector devices 11 being arranged to be opened in response to a drop in pressure in the coolant circuit for admitting steam or two-phase fluid under pressure into the pressure vessel.

Although in the embodiments described above the injector nozzles are arranged to inject steam into the cooling system, in other embodiments of the invention the fluid injected by the injector nozzles may be water or may be a two phase steam/water mixture. The choice of fluid to be injected depends upon the desired optimisation of backward flow blocking efficiency and upon the desirability of maintaining a flow of fluid through the region of the system in the normal direction. For example, in an embodiment of the invention incorporating the injector nozzle shown in FIG. 11, steam may be used as a blockage medium whilst at the same time water is used for maintaining flow, both steam and water being arranged to be discharged from the storage vessel 12.

I claim:

1. An emergency protective arrangement for a cooling system of a kind in which a fluid coolant consisting of a liquid, a gas, a vapor or a two-phase fluid is circulated around the system under pressure through a coolant path including a region to be protected against overheating, the protective arrangement comprising:
   a. means sensing a condition of the coolant feeding said region,
   b. means controlled by said sensing means to inject into the system an auxiliary fluid coolant under pressure following a reduction in the normally circulating coolant feeding said region, which may be due, for example, to a breach in a part of the system upstream from said region, and
   c. nozzle means through which the auxiliary fluid is injected into said coolant path,
   d. said nozzle means being arranged to maintain a flow of coolant in a normal direction through said region and to prevent cessation or reversal of flow through said region for a period of time following said reduction to permit other protective arrangements to become effective.

2. An arrangement as claimed in claim 1, wherein the cooling system is that of a fluid-cooled nuclear reactor and the said region is a reactor core of the nuclear reactor, the nozzle means being arranged to inject the coolant into the coolant path of the cooling system just upstream of the reactor core.

3. An arrangement as claimed in claim 1, wherein the means for injecting into the system coolant under pressure comprises an auxiliary store of high energy coolant connected into the system at an appropriate point through the nozzle means.

4. An arrangement as claimed in claim 3, wherein the coolant within the auxiliary store is maintained at a saturation temperature equivalent to the normal operating pressure of the part of the system to which the nozzle means is connected, so that in the event of the breach, leading to a reduction in pressure in that part of the system, high pressure coolant will be injected into the system automatically.

5. An arrangement as claimed in claim 3, wherein the coolant within the auxiliary store is maintained at a pressure higher than the normal circulating coolant pressure, a normally closed mechanical valve being located between the auxiliary store and the nozzle means, and valve actuating means being arranged to open the valve automatically in response to a drop in pressure in the system.

6. An arrangement as claimed in claim 3, wherein the coolant within the auxiliary store is maintained at a pressure higher than the normal circulating coolant pressure, a normally closed mechanical valve being located between the auxiliary store and the nozzle means, and valve actuating means being arranged to open the valve automatically in response to a breached circuit trip device.

7. An arrangement as claimed in claim 1, wherein the nozzle means is disposed so as to direct the pressure coolant into the coolant path with a component of velocity in the direction of normal coolant flow.

8. An arrangement as claimed in claim 1, wherein the coolant path is formed with a constriction in the vicinity of the nozzle means.

9. An arrangement as claimed in claim 8, wherein the constriction is designed to have a lower resistance to flow in the normal direction than its resistance to back flow.

10. An arrangement as claimed in claim 1, wherein the nozzle means comprises two nozzles disposed in the coolant path just downstream of a venturi constriction.

11. An arrangement as claimed in claim 1, wherein the nozzle means comprises a single nozzle with an outlet disposed concentrically within the bore of the coolant path and just upstream of a venturi constriction.

12. An arrangement as claimed in claim 1, wherein the coolant path has a main bore with a pronounced curvature so that the coolant follows a curved path, and the nozzle means extends through a wall of the main bore on the outside of the curve so that its outlet is coaxial with the outlet of the main bore.

13. An arrangement as claimed in claim 1, wherein the nozzle means are disposed so as to inject coolant substantially tangentially into the coolant path downstream of a constriction so as to produce a vortex in the region of the constriction.

14. An arrangement as claimed in claim 1, wherein the coolant to be injected is the same as the normal circulating coolant.

15. An arrangement as claimed in claim 1, wherein the coolant to be injected is different from the normal circulating coolant.

16. An arrangement as claimed in claim 1, wherein the coolant to be injected is a liquid.

17. An arrangement as claimed in claim 1, wherein the coolant to be injected is a gas.

18. An arrangement as claimed in claim 1, wherein the coolant to be injected is a vapor.

19. An arrangement as claimed in claim 1, wherein the coolant to be injected is a two-phase fluid.

* * * * *